July 2, 1935.  A. VAN MUFFLING  2,006,704
COOKING APPLIANCE
Filed June 1, 1933  2 Sheets-Sheet 1
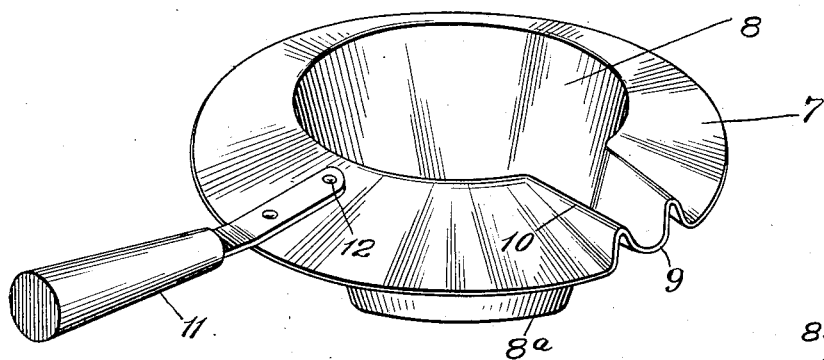
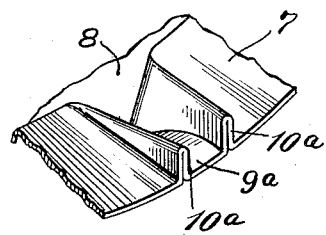
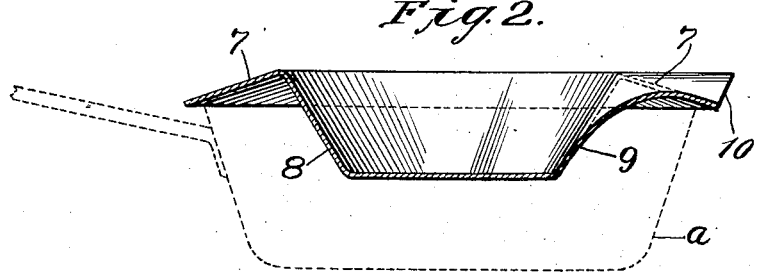
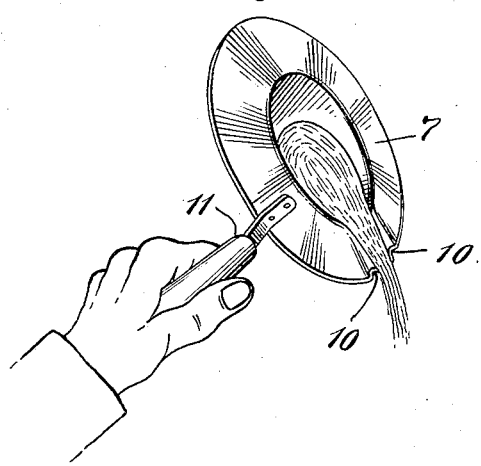
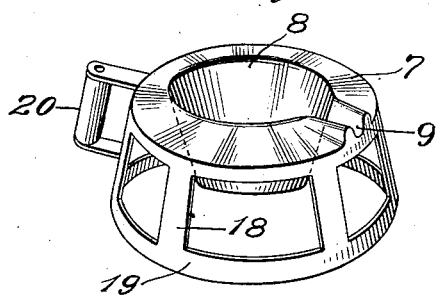
INVENTOR.
ADRIAN VAN MUFFLING
BY
ATTORNEY.

July 2, 1935.  A. VAN MUFFLING  2,006,704
COOKING APPLIANCE
Filed June 1, 1933  2 Sheets-Sheet 2
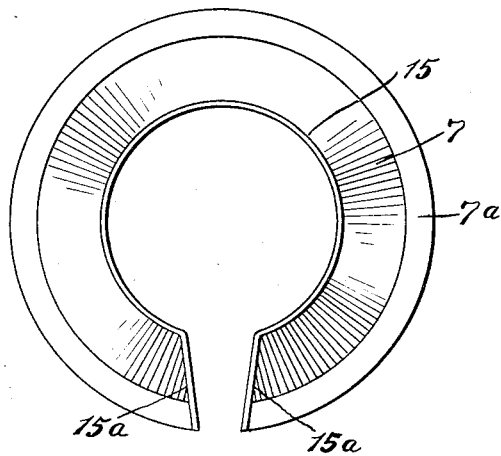
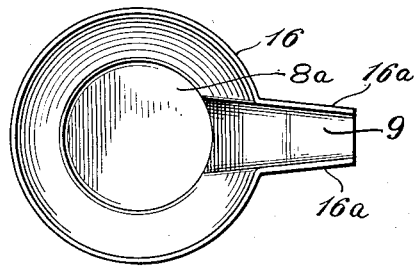
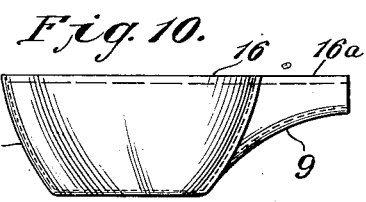
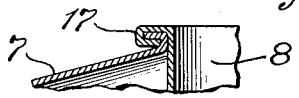
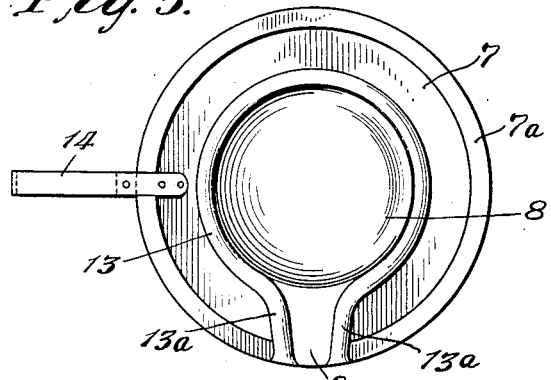
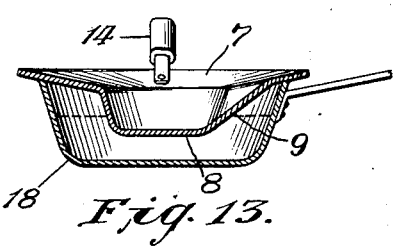
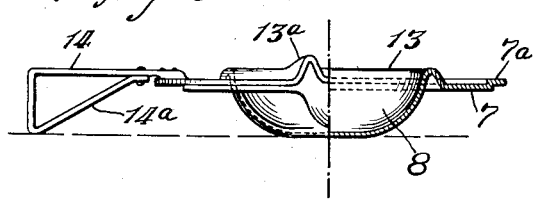
INVENTOR.
ADRIAN VAN MUFFLING
BY
ATTORNEY.

Patented July 2, 1935

2,006,704

UNITED STATES PATENT OFFICE 2,006,704

COOKING APPLIANCE

Adrian Van Muffling, New York, N. Y., assignor of one-third to Carol Woodward, New York, N. Y., and one-third to P. Frank Sonnek, Woodhaven, N. Y.

Application June 1, 1933, Serial No. 673,819

7 Claims. (Cl. 53—1)

This invention relates generally to culinary appliances and is more particularly directed to a new and novel utensil for reducing chocolate, butter and similar materials that are variously used in the cooking art to a liquid state or such other degree of consistency as may be desired, by the application of heat thereto.

While my invention, as will become evident from the present description, may be used in the preparation of a large variety of foods or food ingredients, as, for example, in the poaching of eggs and the concoction of cream and other sauces, for the purposes of this disclosure I have elected to treat it more or less specifically, as it may be utilized in reducing chocolate or a chocolate-containing mixture, to a paste-like or liquid consistency, as may be desired, for use in preparing so-called cake "icing" or for any other purpose to which the reduced material may be applicable.

As is well known, chocolate forms a substantial proportion of all confections and pastries prepared in the home or the commercial kitchen. In the case of the latter, various steam and other more or less costly heat generating systems may be had for effecting the reduction of the chocolate either alone or in conjunction with other materials with which it may be mixed. However, for home use, where only a relatively small quantity of the chocolate or the chocolate mixture is required at a time, as in the preparation of a cake filling or icing, the housewife must resort to all sorts of makeshift methods of "melting" or reducing the chocolate. In some instances, the material is reduced in the ordinary kitchen ladle which is held above the heat generating flame, or supported against another utensil on the stove. Since the direct application of heat to the container will usually result in burning of the chocolate, the former method must generally be resorted to, with the obvious disadvantages and loss of time in the completion of the task in hand. Again, a metal cup or large spoon may be used, or, in lieu thereof, a small stew pan or pot, all of which, of course, are recognized by the housewife as unsatisfactory expedients, but since there is nothing better available, she must, of necessity, use one or the other as best she can.

Therefore, the primary object of this invention is to provide a simple and practical utensil for use by the housewife, as well as others, whereby chocolate and admixtures thereof, may be reduced to the desired state of consistency by the application of heat thereto, in a manner whereby all of those disadvantages which are manifestly inherent to the employment of the existing makeshift methods of doing the work, will be entirely obviated.

It is also an important object of this invention to provide a novel and utilitarian utensil that may be employed in the preparation of various articles of food and food ingredients, as by cooking or warming, or so-called re-heating, and which, by reason of its design and its possible modes of use, will also permit of the attainment of many new and pleasing results, not only in the treatment of staple foodstuffs, but in the combination of ingredients for making sauces, pastry fillings, icings and the like.

A further object of my invention is to provide a cooking utensil possessing the aforesaid advantages and characteristics, which is adapted to function through the medium of heat indirectly applied thereto, as in steam-heating, the utensil taking such forms as will admit of its use in conjunction with another utensil of a conventional type, as a cooperating part thereof, or as an independent appliance.

Another object of my invention, one which is important in kitchen economics, is the production of my utensil in the form of a pot or stew pan cover or lid, whereby the ordinary cover or lid may be dispensed with, if desired, my utensil, of course, being available for the performance of its specific functions, whenever required.

Other objects and advantages flowing from the practicing of my invention will doubtless become manifest as the description proceeds, and I would have it clearly understood that I reserve unto myself all rights to the full range of equivalents, both in structure and in use, to which I may be entitled under my invention in its broadest aspect.

For the purposes of this disclosure, I have elected to illustrate and describe certain preferred embodiments of my invention. However, my invention may take other forms within the purview of the appended claims, as will be obvious.

In the accompanying drawings:

Figure 1 is a view in perspective of one embodiment of my invention.

Figure 2 is a transverse section on a line bisecting the structure shown in Figure 1, through the spout thereof, with a cooperating vessel indicated in dotted lines.

Figure 3 is a view in perspective, illustrative of the manner in which the reduced material is poured from the utensil.

Figure 4 is a fragmentary perspective of a modified form of spout that may be incorporated in the design of Figure 1.

Figure 5 is a top plan view of another form which the invention may take, wherein the defining surfaces of the peripheral edge of the utensil and of the central depression or cup and merging spout are emphasized, by beading or the like.

Figure 6 is an elevation, partly in section, of the embodiment of the invention shown in the preceding figure, illustrating the supporting medium therefor.

Figure 7 is a plan view of the body portion of a utensil of an assembled construction.

Figure 8 is a view in elevation of such an assembled structure, looking toward the spout.

Figure 9 is a plan view of the cup member of the assembly shown in Figure 8.

Figure 10 is a side elevation of the cup or container of Figure 9.

Figure 11 is a fragmentary section, illustrative of the manner in which the assembly of the components of the utensil shown in Figure 8 may be effected.

Figure 12 is a view in perspective of a form of my invention, wherein supporting means are incorporated therein, and Figure 13 is a sectional elevation of a conventional type of cooking pot with which my utensil is associated as a cover or lid and so conformed as to present an approximately concave or dishlike upper surface.

Referring now to the drawings in detail, in which like characters of reference are employed to designate similar parts in the several views, and more particularly to the form of the invention shown in Figures 1 to 3, inclusive, it will be observed that my utensil embodies an annular body-portion 7 having a central depression 8, substantially in the form of a cup, with which the spout 9, extending through the body-portion 7 to the periphery thereof, communicates.

The utensil may be drawn or pressed from any suitable sheet metal, as aluminum, copper or the like, the upper defining edge of the cup or depression 8 being above the outer edge or rim of the body-portion, so that a downward inclination is imparted to the surface of the latter from its cup abutting line to its periphery, the spout 9 being formed by the crimping or extruding of the metal, as shown at 10, and having an upward curvature, substantially as shown in Figure 2.

By upsetting the body portion as described, a cup or depression of the requisite depth may be provided so that when the utensil is superposed upon a cooking pot, as indicated at a in Figure 2, to function as a cover therefor, there will be sufficient clearance between the base of the cup or depression and the bottom of the pot a to permit of the disposition within the pot of the quantity of food that the latter customarily contains in use. Obviously, the utensil may thus function solely as a pot cover or closure, under the usual cooking conditions, or, while it is in position upon the pot, it may be used for any of the many specific methods of heating or cooking, to which it is applicable. For example, the pot a may contain potatoes immersed in water to a level below or above the base line of the cup 8 and while the potatoes are being boiled in the steaming water, any desired material or mixture of ingredients may be introduced into the cup for the heat reducing treatment. Assuming that the material is chocolate, or a chocolate mixture, milk or sugar or the like, may be added thereto and the whole stirred or agitated with a spoon or other appropriate implement, the utensil, meantime, being held in position or steadied upon the pot or vessel a by the user grasping the handle 11 with the left hand, the spoon or the like, as is customary, being manipulated with the free right hand. Similarly, in pouring the semi-liquid or liquefied mixture or material from the cup, the utensil is held in the left hand, as shown in Figure 3 of the drawings. Manifestly, the handle 11, which may be riveted, welded or otherwise fixed to the utensil body-portion 7, is appropriately located relatively to the outlet or mouth of the spout 9 to facilitate the handling of the utensil in the manner described.

Of course, stirring of the material is not always essential and under such conditions, the utensil may be safely left unattended during the reducing period, since the fact that it is positively supported eliminates all possibility of spillage of the cup contents, while the method of indirectly applying the heat to the cup insures against that overheating, or spotty heating and consequent burning or scorching of the chocolate or other material, which is an ever-present hazard where the cooking utensil is subject to direct heating, as when placed over the gas flame. This, obviously, is also true with respect to materials that are agitated, while being reduced to the required consistency, the heated water in contact with the dependent cup 8, or the steam generated within the pot impinging thereagainst, effecting a substantially uniform transmission of heat units to the material within the cup.

In lieu of the hill and dale method of forming the metal to provide the spout 9, as in the structure shown in Figure 1, the opposed surfaces of the metal forming the spout may be compressed within the zone of the body portion 7, to impart to the spout and to its defining walls a configuration conforming substantially to that shown in Figure 4, the said defining walls being indicated by the reference character 10a.

In the construction shown in Figures 5 and 6, a bead 7a or analogous-appearing surface defines the periphery of the body-portion 7, while the cup 8 and the spout 9 are defined by substantially rolled surfaces, as indicated at 13a, raised above the plane of the abutting portion of the body 7. (See Figure 6.) Further, in this embodiment of the invention, the handle 14, which may be formed of strap metal or other suitable material, is provided with a 90° offset, connected to the major length of the handle by the oblique section 14a. The length of the aforesaid offset corresponds to the depth of the cup 8 and thus the offset functions as a standard to maintain the utensil in a level position when it is placed upon a table or the like. (See Figure 6.) Manifestly, the handle 14 may take other forms in attaining the object to which this particular design is directed.

The utensil, as shown in Figure 8 is of a so-called assembled construction, the body-portion 7, provided with a peripheral bead or step, similarly to a conventional pot cover, as indicated at 7a, is blanked out in the form shown to produce an upstanding flange 15, 15a, defining the shape of the cup and the converging sides of the spout 9, the cup and the spout, as shown in Figures 9 and 10 being separately formed, as by a drawing operation, with surfaces 16 and 16a that are adapted to register or mate with the flanges 15 and 15a of the body-portion 7 for the formation of an interlocking jointure of the two utenall components, such, for example, as illustrated at 17, in Figure 11.

The construction shown in Figure 12, corresponds generally to that illustrated in Figure 1, except that it embodies a supporting base, as the annulus 19 connected to the body-portion of the utensil or to a cooperating surface, by the sections 18, one of the latter having a handle 20 suitably affixed thereto. With this construction, the utensil may be placed within another receptacle, as upon the bottom thereof, or where the material being worked with makes it desirable, it may be placed directly over an open flame, as a gas burner, the spacing of the connecting surfaces 18 preventing a too great concentration of heat upon the dependent cup, as would be the case, were the latter wholly enclosed, within the base. Of course, in substitution for the structure shown, one might be provided in which the cup is carried on a spider or arms within the base, a large portion of the metal thereby being eliminated, or the base might be of any of preferred design that would respond to the objectives to which the present showing is directed.

In the modification of the invention illustrated in Figure 13, the body-portion 7 and the cup 8, with the spout 9, generally conform to that of the embodiment shown in Figure 1. It will be observed, however, that the body-portion 7 takes a downward inclination from its peripheral edge so that the cup 8 is brought closer to the bottom of the pot 18 thereby making it possible to almost submerge the cup within the water contained in the pot, the water level in the present instance being indicated by a dotted line. Since in extruding or drawing metal, there are certain limits within which the operation may be performed without rupturing the metal, this form of the invention renders it possible to attain those advantages that may flow from the partial or complete submergence of the cup within the water contained within the pot, the cup, in this instance, being of the same or approximately the same depth as that which is employed in the form of the invention shown in Figure 1. In this connection, it may be pointed out that actual kitchen tests have demonstrated that certain cup dimensions, that is diameter and depth, produce highly satisfactory results in the use of the invention, so that where the dimensions of a cup may be made standard, provision may be likewise made for using such standard dimensioned cup in any preferred form of body-portion. Of course, this particular relationship of the cup to the body-portion is not absolutely essential to the functioning of the invention as described, but, nevertheless, as is well known, the most ideal results in any operation may be attained by conforming to certain standards.

While, I have described my invention more or less in detail, as it may be utilized in reducing chocolate and similar materials, as before pointed out many novel dishes may be prepared by the use of my appliance. For instance, eggs may be poached without water, the egg simply being dropped into the cup 8 and cooked by the steam impinging thereagainst. The same is true as to numerous other food stuffs. Again, a vegetable or even meat may be kept warm, after cooking, while awaiting the arrival of the master of the house, by placing it in the cup 8 and permitting it to slowly absorb the heat therefrom, without giving it that warmed over taste or dried up appearance that results from the usual methods of reheating.

As will be manifest, the invention may take other forms than those herein illustrated and the same is true as to the relationship of the respective cooperating elements, within the spirit and scope of this disclosure.

I claim:

1. A cooking utensil embodying a body-portion, having a substantially flat surface and adapted to function as the supporting element of said utensil in a cooking operation, a cup dependent centrally of said body-portion and an outlet communicating with the base of said cup and extending through said body-portion, the surface and peripheral contour of said body-portion being interrupted by said outlet.

2. A cooking utensil formed from a single piece of sheet metal, having a body-portion embodying a substantially flat surface, a cup dependent centrally of said body-portion and an outlet extending from the base of said cup through said body-portion to the periphery of the latter, the said outlet being defined by surfaces converging from the cup wall and base to the mouth thereof, said body-portion functioning to support said cup in spaced relation to a surface parallel to the base line of said cup in a cooking operation.

3. A cooking utensil formed from sheet metal, having a body-portion embodying a substantially flat surface of an annular outline, a cup concentric therewith and dependent therefrom, the upper edge of the cup merging into the body-portion, an outlet formed by converging surfaces extending from the wall and base of the cup diametrically through the body-portion to the periphery of the latter, the mouth of the outlet being above the horizontal plane of the base of the cup, and a handle fixed to said body-portion.

4. A cooking utensil embodying a body-portion of an annular outline provided with an annular cut-out defined by an upstanding flange, the definition of said cut-out being interrupted by a substantially tapering extension therefrom through said body-portion to the periphery of the latter, said extension being flanged in continuation of the defining flange of said annular cut-out, a cup-like vessel having a lateral extension formed by surfaces converging from the base thereof to a point thereabove, said vessel and said extension having a contour adjacent their top-defining edges complemental to that of said annular cut-out and the tapering extension thereof, whereby portions of the upper edges of said vessel and lateral extension may be mated with the flange defining said cut-out area for interlocking engagement, said lateral extension providing an outlet from said vessel through said body portion.

5. A cooking utensil having a body-portion of an annular contour, a cup-like vessel dependent centrally thereof, an outlet from said vessel through said body-portion to the periphery thereof, said outlet being upwardly inclined from the base of said vessel, said vessel and said outlet merging into said body-portion in surfaces above the plane of the remainder of said body-portion.

6. A cooking utensil having a body-portion of an annular contour, a cup-like vessel dependent centrally thereof, an outlet from said vessel through said body-portion to the periphery of the latter, said utensil being adapted to be supported upon another cooking vessel as a closure therefor, when performing its predetermined function, and a handle for lifting said utensil from the supporting cooking vessel, said handle embodying means cooperating with said cup-like vessel to support said utensil from a table top or other surface.

7. As a new article of manufacture, a utensil for cooking material only by heat transmitted thereto from the interior of a supporting vessel, said utensil being adapted to function as a cover for such vessel and embodying a substantially flat rim-like body-portion formed with a central depression providing a dependent cup-like container for the material to be cooked, a handle fixed to said body-portion and an open spout for conducting material from said container in a pouring operation, said spout extending from the base of said container diametrically through said body-portion, the surfaces defining said spout in the zone of said body-portion being raised above the contiguous surfaces of said body-portion.

ADRIAN VAN MUFFLING.